J. H. BURKHOLDER.
LIFT JACK FOR AUTOMOBILES.
APPLICATION FILED MAR. 11, 1910.
1,004,741.
Patented Oct. 3, 1911.
2 SHEETS—SHEET 1.
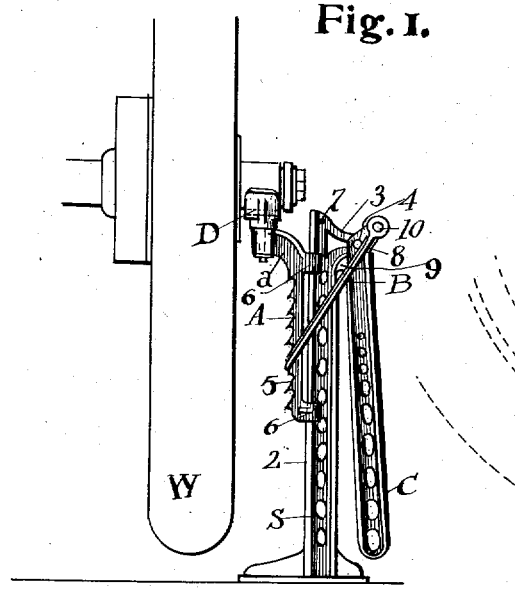
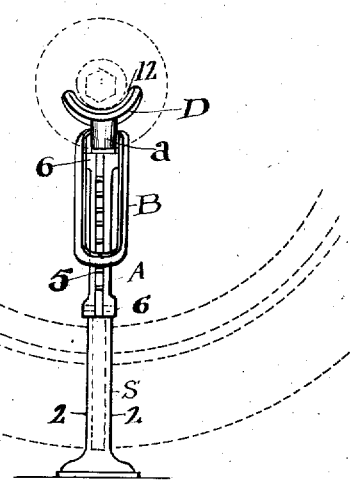
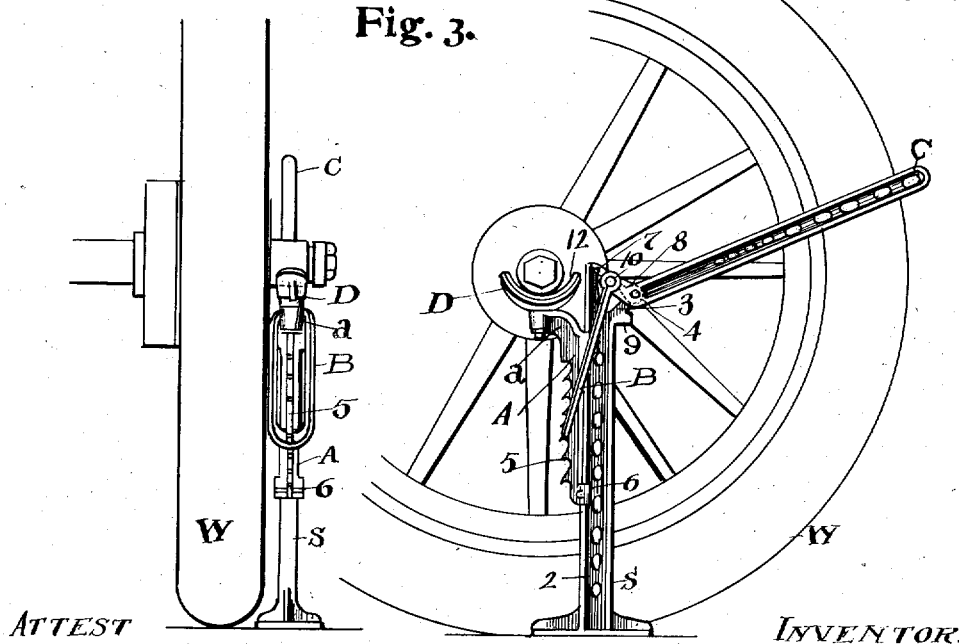
ATTEST
E. M. Fisher
F. C. Mussun
INVENTOR.
JOHN H. BURKHOLDER
BY Fisher & Moore ATTYS.

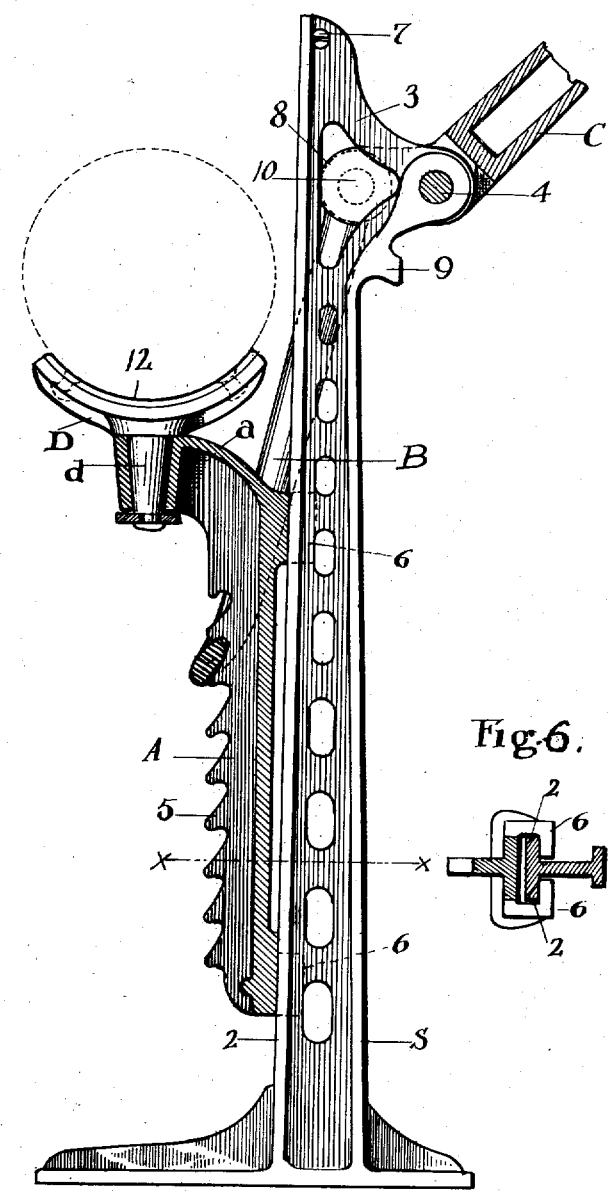

UNITED STATES PATENT OFFICE.

JOHN H. BURKHOLDER, OF ASHLAND, OHIO.

LIFT-JACK FOR AUTOMOBILES.

1,004,741.      Specification of Letters Patent.      Patented Oct. 3, 1911.

Application filed March 11, 1910. Serial No. 548,717.

*To all whom it may concern:*

Be it known that I, JOHN H. BURKHOLDER, citizen of the United States, residing at Ashland, in the county of Ashland and State of Ohio, have invented certain new and useful Improvements in Lift-Jacks for Automobiles, of which the following is a specification.

My invention relates to improvements in lift jacks for vehicles, and while the jack shown and described herein is adapted to be used as other lift jacks generally are, it is more especially intended to serve as a rest for resting pneumatic tires on machines as they stand idle in barn or garage, all substantially as shown and described and particularly pointed out in the claims.

In the accompanying drawings, Figure 1 is a side elevation of the jack shown as engaged beneath what may be assumed to be the hub of an automobile wheel and showing the wheel raised from the floor. Fig. 2 is an inside elevation of the jack with the wheel more or less in dotted lines. Fig. 3 shows a wheel and the jack sidewise under the hub instead of frontwise as in Fig. 1, and Fig. 4 is a direct front view of Fig. 3, showing the parts in position to raise the wheel. Fig. 5 is an elevation partially in section of the parts substantially as seen in Fig. 4 but much enlarged. Fig. 6 is a cross section of Fig. 5 on line x—x.

As thus shown S represents the standard or upright supporting member of the jack which, on account of the special uses for which this jack is intended, should possibly have a wider base than might be deemed desirable for common lift-jacks, and said standard is otherwise provided with lateral flanges 2 appositely along its front edge and an arm or projection 3 at its rear and top to engage the handle C. The operating parts of the jack are mounted on said standard and comprise a lift bar or member A, having ratchet teeth on its outer edge, a yoke B and an operating handle C, thus constituting practically a four-part structure with a rest or hub supporting head or member D pivotally or rotatably mounted in a lateral projection or bracket portion *a* from lift-bar A, and which resembles an arm extending outward or rearward from the top of said member A. The said projection or arm *a* is shown as having a preferably somewhat tapered bore or hole vertically in its extremity adapted to receive the shank or stem *d* of said rest D in a swiveled or rotatable relation, so that said rest may be turned to any desired position rotarily according to the position the jack must be placed to make the lift. The said lift member A has ratchet teeth 5 in its outer edge and ears or lugs 6 top and bottom at its inner edge bent inward laterally behind the side flanges or heads 2 of the standard and slidably engaged thereon, and a cotter pin 7 or its equivalent is inserted through a hole in the webbing in the top of standard S after said member A has been slid down thereon over said flanges to prevent accidental withdrawal of said member in use. This connects the said parts in a separable manner but keeps them together for all working purposes.

The standard S has the arm or extension 3 at its top and side with handle or lever C pivoted thereon, and said handle or lever has a bifurcated extremity 8 at an obtuse angle to the body thereof wholly outside its pivot 4 and constituting substantially a crank handle or lever, and the upper end of yoke B is pivoted in or upon the end of said bifurcated or crank portion 8. Otherwise said yoke is swung over both the standard and lift member A to the opposite side and hangs at an inclination from its pivot in supporting position and connection with said ratchet teeth 5.

Now, observing more closely than in the foregoing the relationship of the yoke and handle and lift member A, it will be seen, Fig. 1, that when the parts are in standing position, as when supporting a wheel, the lever or handle hangs down close to the standard and against stop 9 at its top at the base of bracket 3, and when in this position the handle has carried the pivot 10 of the yoke thereon across or outward beyond pivot 4 on bracket 3 a sufficient distance to throw the lever over the dead center at least so far that now the pull on the yoke tends to draw the handle toward the standard rather than away from it. Of course with such construction no other means are required to fix the parts in a position of rest with a load on the jack, and such position is easily chosen when the jack is placed under a wheel. All that is required is to place the jack where it is to stand and then raise the lift member into engaging position beneath the part to be raised and at the same time engage yoke B under the corresponding or nearest ratchet tooth 5 with the lever in raised position, of course. Then by depressing the lever or handle to its lowest position the wheel or axle or other part engaged will be raised sufficiently to free the wheel from the floor and the work will be done and the jack locked.

The hubs of automobiles usually have a fine paint or varnish finish and therefore to protect the same and avoid possible injury to paint or bead or other surface ornamentation, I prefer to lay a leather, rubber, or other protecting lining or cushioning 12 in rest D.

The lift movement imparted by handle C is only sufficient to raise the tread of the wheel W from the floor, but the adjustment of member A upon standard S covers a wide range of up and down adaptation and movement, and in this connection it is seen that the use of a side projection or extension $a$ is important and of decided advantage. Thus, said projection permits member A to be dropped to a very low level to engage beneath an unusually low wheel-hub or vehicle axle while at the same time the standard is brought very close to the part engaged and may extend to a greater height than said object, see Fig. 5. This figure or view also clearly discloses that rest D has perfect freedom to be rotated upon its axis regardless of its relative elevation whether higher or lower than the top of the standard, and the depression or transversely curved formation on the top of said rest or head is adapted to receive and center the hub or other object engaged.

It should have been observed that the standard S has a base extension $b$ at its front, and that the arm $a$ of the left bar is directly above this extension. The head or rest D for the object to be raised is axially swiveled in the said arm so that it makes no difference how the jack is positioned in respect to the wheel to be raised and the weight will always come in the same place and the jack will stand erect and carry its load.

I claim:

1. In a device of the character described, a standard, a lift-bar mounted upon the edge a lift-bar having slidable engagement on said flanges and provided with an outward projection integral with the front edge thereof, and a head having a free pivot on said projection to rotate horizontally, and means to raise said lift-bar in respect to said standard.

2. In a device of the character described, a standard, a lift-bar mounted upon the edge thereof and provided with an integral arm at its top and a socket in its extremity and a head having a transverse depression on its top adapted to engage the object to be raised and a spindle on its bottom rotatable in said socket.

In testimony whereof I affix my signature in presence of two witnesses.

JOHN H. BURKHOLDER.

Witnesses:
 E. M. FISHER,
 F. C. MUSSUN.

---

Correction in Letters Patent No. 1,004,741.

It is hereby certified that in Letters Patent No. 1,004,741, granted October 3, 1911, upon the application of John H. Burkholder, of Ashland, Ohio, for an improvement in "Lift-Jacks for Automobiles," an error appears in the printed specification requiring correction as follows: Page 2, line 54, strike out the words "a lift-bar mounted upon the edge" and insert the words and comma *having flanges at its front edges*, and that the said Letters Patent should be read with this correction therein that the same may conform to the record of the case in the Patent Office.

Signed and sealed this 21st day of November, A. D., 1911.

[SEAL.]

E. B. MOORE,
*Commissioner of Patents.* engaging position beneath the part to be raised and at the same time engage yoke B under the corresponding or nearest ratchet tooth 5 with the lever in raised position, of course. Then by depressing the lever or handle to its lowest position the wheel or axle or other part engaged will be raised sufficiently to free the wheel from the floor and the work will be done and the jack locked.

The hubs of automobiles usually have a fine paint or varnish finish and therefore to protect the same and avoid possible injury to paint or bead or other surface ornamentation, I prefer to lay a leather, rubber, or other protecting lining or cushioning 12 in rest D.

The lift movement imparted by handle C is only sufficient to raise the tread of the wheel W from the floor, but the adjustment of member A upon standard S covers a wide range of up and down adaptation and movement, and in this connection it is seen that the use of a side projection or extension $a$ is important and of decided advantage. Thus, said projection permits member A to be dropped to a very low level to engage beneath an unusually low wheel-hub or vehicle axle while at the same time the standard is brought very close to the part engaged and may extend to a greater height than said object, see Fig. 5. This figure or view also clearly discloses that rest D has perfect freedom to be rotated upon its axis regardless of its relative elevation whether higher or lower than the top of the standard, and the depression or transversely curved formation on the top of said rest or head is adapted to receive and center the hub or other object engaged.

It should have been observed that the standard S has a base extension $b$ at its front, and that the arm $a$ of the left bar is directly above this extension. The head or rest D for the object to be raised is axially swiveled in the said arm so that it makes no difference how the jack is positioned in respect to the wheel to be raised and the weight will always come in the same place and the jack will stand erect and carry its load.

I claim:

1. In a device of the character described, a standard, a lift-bar mounted upon the edge a lift-bar having slidable engagement on said flanges and provided with an outward projection integral with the front edge thereof, and a head having a free pivot on said projection to rotate horizontally, and means to raise said lift-bar in respect to said standard.

2. In a device of the character described, a standard, a lift-bar mounted upon the edge thereof and provided with an integral arm at its top and a socket in its extremity and a head having a transverse depression on its top adapted to engage the object to be raised and a spindle on its bottom rotatable in said socket.

In testimony whereof I affix my signature in presence of two witnesses.

JOHN H. BURKHOLDER.

Witnesses:
E. M. FISHER,
F. C. MUSSUN.

---

It is hereby certified that in Letters Patent No. 1,004,741, granted October 3, 1911, upon the application of John H. Burkholder, of Ashland, Ohio, for an improvement in "Lift-Jacks for Automobiles," an error appears in the printed specification requiring correction as follows: Page 2, line 54, strike out the words "a lift-bar mounted upon the edge" and insert the words and comma *having flanges at its front edges*, and that the said Letters Patent should be read with this correction therein that the same may conform to the record of the case in the Patent Office.

Signed and sealed this 21st day of November, A. D., 1911.

[SEAL.]

E. B. MOORE,
*Commissioner of Patents.*

Correction in Letters Patent No. 1,004,741.

It is hereby certified that in Letters Patent No. 1,004,741, granted October 3, 1911, upon the application of John H. Burkholder, of Ashland, Ohio, for an improvement in "Lift-Jacks for Automobiles," an error appears in the printed specification requiring correction as follows: Page 2, line 54, strike out the words "a lift-bar mounted upon the edge" and insert the words and comma *having flanges at its front edges*, and that the said Letters Patent should be read with this correction therein that the same may conform to the record of the case in the Patent Office.

Signed and sealed this 21st day of November, A. D., 1911.

[SEAL.]

E. B. MOORE,
*Commissioner of Patents.*